United States Patent [19]

Tano et al.

[11] 4,222,644
[45] Sep. 16, 1980

[54] DIGITAL EXPOSURE DISPLAY CIRCUIT

[75] Inventors: Eiichi Tano, Asaka; Masahiro Kawasaki, Tokyo, both of Japan

[73] Assignee: Asahi Kogaku Kogyo Kabushiki Kaisha, Tokyo, Japan

[21] Appl. No.: 878,104

[22] Filed: Feb. 15, 1978

[30] Foreign Application Priority Data

Mar. 2, 1977 [JP] Japan .................................. 52-22363

[51] Int. Cl.³ ............................................. G03B 17/18
[52] U.S. Cl. .............................. 354/23 D; 354/60 L
[58] Field of Search ...................... 354/23 D, 53, 60 L

[56] References Cited

U.S. PATENT DOCUMENTS

| 4,064,515 | 12/1977 | Mashimo et al. ................... 354/23 D |
| 4,090,207 | 5/1978 | Mashimo et al. ................... 354/23 D |
| 4,114,995 | 9/1978 | Stieringer et al. .................. 354/23 D |
| 4,117,500 | 9/1978 | Kondo ................................ 354/23 D |

Primary Examiner—L. T. Hix
Assistant Examiner—William B. Perkey
Attorney, Agent, or Firm—Sughrue, Rothwell, Mion, Zinn and Macpeak

[57] ABSTRACT

A digital exposure display circuit operates a display element to display exposure information in a camera employing selectable photographing systems including a lens stop priority system, a shutter speed priority system and a manual photographing system. The display circuit includes a first circuit for outputting a voltage proportional to the sum of the brightness of an object to be photographed and a film sensitivity and a second circuit for outputting a voltage proportional to a value obtained by substracting a lens stop value from the output of the first circuit. The display circuit also includes a constant voltage source and a voltage source for providing a voltage corresponding to a manually set shutter speed. A single analog-to-digital converter is provided to generate part of the address of a read only memory. The rest of the read only memory address is provided by a selecting circuit which selects the outputs of the second conduit and the constant voltage source in the lens stop priority system, the output of the first circuit and the voltage source in the shutter speed priority system, and the outputs of the second circuit and the voltage source in the manual photographing system. The selected outputs are supplied to the input of the analog-to-digital circuit. The output of the read only memory is used to energize a display element.

7 Claims, 9 Drawing Figures

4,222,644

DIGITAL EXPOSURE DISPLAY CIRCUIT

BACKGROUND OF THE INVENTION

This invention relates to exposure information display circuits in cameras, and more particularly to a display circuit in which various inputs are subjected to digital operations, and the resultant outputs are employed to display various pieces of exposure information in the finder.

A large number of pieces of information are necessarily displayed in high-grade cameras employing a variety of photographing systems, such as for instance a so-called lens stop priority system in which the lens stop is manually set and the shutter speed is set automatically (hereinafter referred to as "an ES system" when applicable), so-called shutter speed priority photographing system in which the shutter speed is manually set and the lens stop is set automatically (hereinafter referred to as "an ES system" when applicable), and a so-called manual photographing system in which both of the lens stop and the shutter speed are manually set. That is, it is necessary to display characters or symbols by which the automatically set shutter speed in the ES system are indicated, to display characters or symbols by which the automatically set lens stop value in the EE system are indicated, and to display characters or symbols by which the condition indicating whether or not the correct exposure determined by manually setting the shutter speed and the lens stop and the difference from the correct exposure are indicated in the case where the manual photographing system is employed.

SUMMARY OF THE INVENTION

An object of this invention is to provide a display circuit simple in construction which operates a display element such as a light emitting diode (LED) to display the above-described exposure information. This specific feature of the display circuit according to the invention resides in that voltage information as analog data in various photographing systems is converted into digital data by one common analog-to-digital converter circuit (hereinafter referred to as "an A/D converter circuit" when applicable).

DESCRIPTION OF THE PREFERRED EMBODIMENTS

Figure 1:
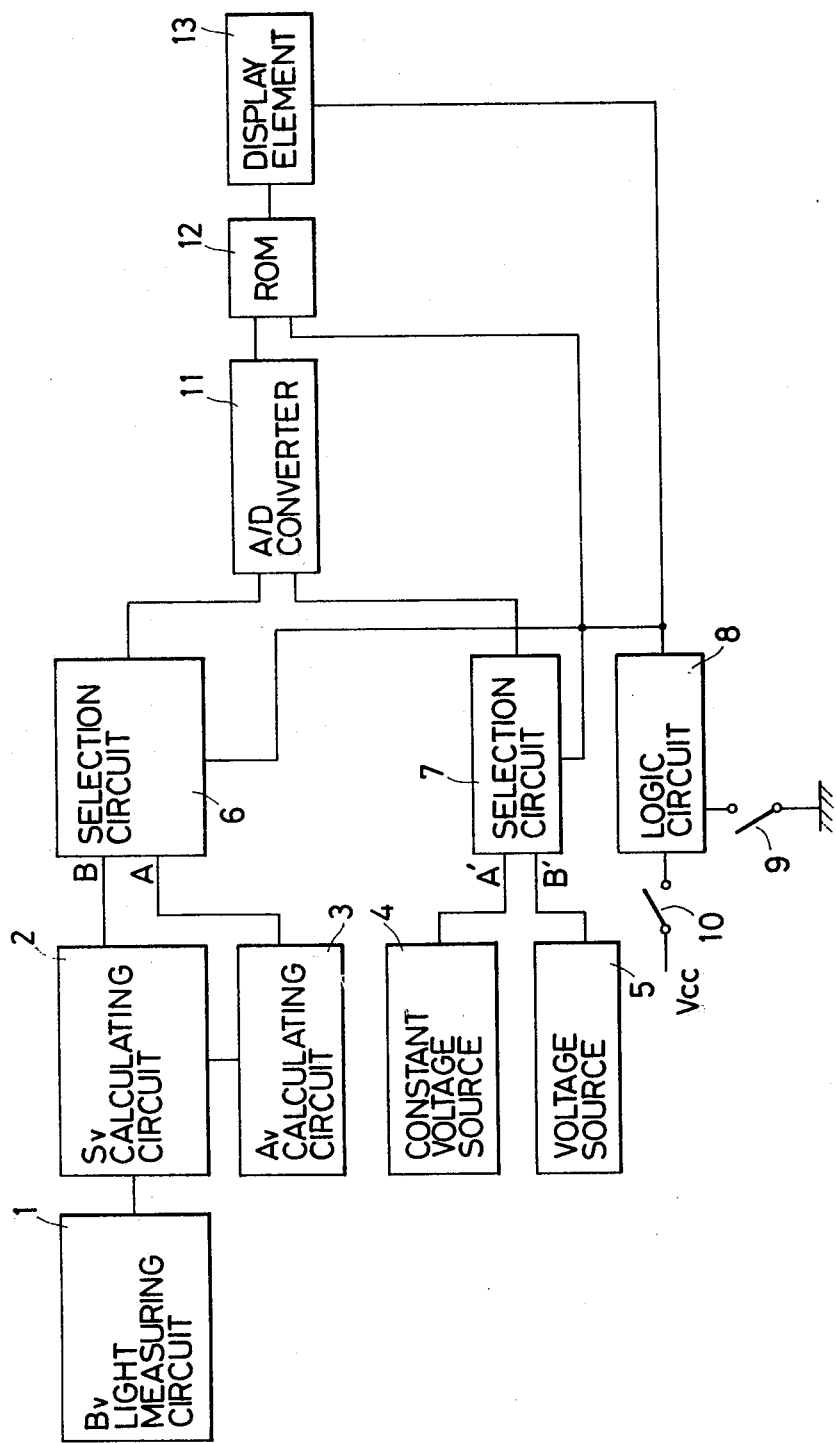
FIG. 1 is a block diagram illustrating one example of a digital exposure display circuit according to this invention.

One example of a digital exposure display circuit according to the invention is shown in FIG. 1 in which a light measuring circuit 1 generates the apex value $B_V$ of an object's brightness, and the output of the light measuring circuit 1 is connected to an $S_V$ calculating circuit 2 operating to generate the apex value $S_V$ of film sensitivity. An $A_V$ calculating circuit 3 is connected to the circuit 2 for generating the apex value $A_V$ of a camera's lens stop value. The outputs of the circuits 2 and 3 are applied to a selection circuit 6. (Hereinafter, the output of the $S_V$ calculating circuit 2 will be represented by B which has been suitably shifted, and the output of the $A_V$ calculating circuit 2 will be represented by A.) A constant voltage source 4 provides a constant voltage corresponding to the apex value $T_V = 11$ which corresponds to a shutter speed of 1/2000 second in the ES system, and a voltage source 5 generates a voltage corresponding to the apex value $T_V$ in the EE photographing system or in the manual photographing system. The outputs of the constant voltage source 4 and the voltage source 5 are applied to a selection circuit 7. (Hereinafter, the outputs of the constant voltage source 4 and the voltage source 5 will be represented by A' and B', respectively). The aforementioned outputs A, B, A' and B' satisfy the following relations: $A' \geq A$, $B' \geq B$, and $B' \geq A$. A logic circuit 8 is controlled by switches 9 and 10 operating in association with a mechanism (not shown) which operates to switch between the three photographing systems. The outputs A or B, and A' or B' are applied to an analog-to-digital (A/D) converter 11 through the selection circuits 6 and 7 which are controlled by the logic circuit 8. The A/D converter 11 is so designed as to convert the difference voltage between the two voltages applied thereto into a digital output. An IC memory 12, that is, a read only memory (ROM), is addressed by the A/D converter 11 and the logic circuit 8. A display element 13 displays numbers, characters or symbols and typically consists of a plurality of segments. The display element 13 is driven by the outputs of the ROM 12 and the logic circuit 8.

In response to the on-off operations of the switches 9 and 10, the logic circuit 8 operates to apply the outputs A and A' through the selection circuits 6 and 7 to the A/D converter circuit 11, in the case of the ES system. The output A is a voltage obtained by combining the object's brightness apex value $B_V$, the film sensitivity apex value $S_V$, and the aperture apex value $A_V$, while the output A' is a constant voltage corresponding to $T_V$ 11 (=1/2000 second), as was described above. Therefore, the digital data obtained by the difference voltage applied to the A/D converter 11 corresponds to the shutter speed which is automatically set in the ES photographing system. Similarly, in the case of the EE photographing system, the outputs B and B' are applied to the A/D converter circuit 11. The output B is a voltage obtained by combining the object's brightness apex value $B_V$ and the film sensitivity apex value $S_V$, while the output B' is a voltage corresponding to the shutter speed apex value $T_V$, as was described before. Therefore, the digital data obtained by the difference voltage applied to the A/D converter 11 is the lens stop value which is automatically set in the EE photographing system. In the case of the manual photographing system, the outputs A and B' are applied to the A/D converter circuit 11. The output A is a voltage obtained by combining the outputs $B_V$, $S_V$ and $A_V$, while the output B' is a voltage corresponding to the shutter speed apex $T_V$, as was described before. Therefore, the digital data obtained by the difference voltage applied to the A/D converter 11 will indicate whether or not the exposure is suitable, or a value which differs from the suitable exposure value, in the manual photographing system. Exposure information is obtained from the output of the ROM which is addressed by the outputs of the logic circuit 8 and the A/D converter circuit 11, and is displayed by the display element 13. The output of the logic circuit 8 is applied, as information, to the display element 13 so as to cause the element 13 to display the selected photographing system: the ES system, the EE system, or the manual system.

Figure 2:
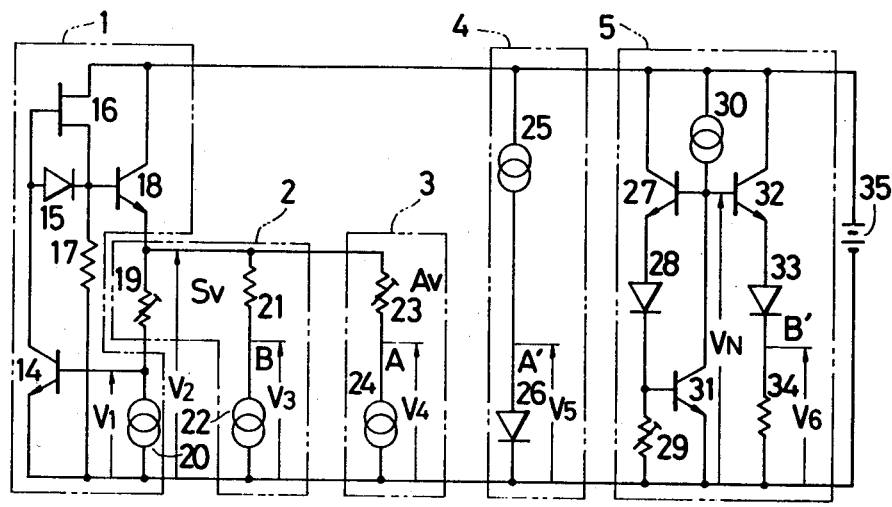
FIG. 2 is a schematic circuit diagram showing a light measuring circuit 1, and $S_V$ calculating circuit 2, an $A_V$ calculating circuit 3, a constant voltage source 4 and a voltage source 5 shown in FIG. 1.

FIG. 2 shows more concretely the light measuring circuit 1, the $S_V$ calculating circuit 2, the $A_V$ calculating circuit 3, the constant voltage circuit 4 and the voltage source 5 shown in FIG. 1. In FIG. 2, the collector of a logarithmic compression transistor 14 is connected to the gate of a field-effect transistor (FET) 16 which forms a self-biasing circuit with a light receiving element 15 and a resistor 17. The source of the FET 16 is connected to the base of a transistor 18 which forms an emitter follower having as a load the parallel connection of a series circuit of an $S_V$ variable resistor 19 corresponding to the film sensitivity apex value $S_V$ and a constant current source 20, a series circuit of a level shifting resistor 32 and a constant current source 22, and a series circuit of an $A_V$ variable resistor 23 corresponding to the aperture apex value $A_V$ and a constant current source 24. The constant current source 20 is connected to the base of the transistor 14. A diode 26 is connected in series with a constant current source 25 across a power supply 35. A $T_V$ variable resistor 29 is manually set corresponding to the shutter speed apex value $T_V$ in the case of the EE photographing system or in the manual photographing system. One terminal of the variable resistor 29 is grounded, while the other terminal thereof is connected to the base of a transistor 31 whose emitter is grounded and to the cathode of a diode 28. The anode of the diode 28 is connected to the emitter of a transistor 27 whose base is connected to a constant current source 30. This constant current source 30 is connected to the collector of the transistor 31 and to the base of a transistor 32 the collector of which is connected to the power supply 35. The emitter of the transistor 32 is connected through a diode 33 to a resistor 34 which is grounded.

The operation of the circuit shown in FIG. 2 will be described. Feed-back is effected from the collector of the transistor 14 which is driven in a constant current mode by the photocurrent $i_p$ of the light receiving element 15, through the FET 16, the transistor 18, and the $S_V$ variable resistor 19 to the base of the transistor 14. Therefore, the base-emitter voltage $V_1$ of the transistor 14 can be expressed by the following equation (1):

$$V_1 = \frac{KT}{q} \cdot \ln \cdot \frac{i_p}{i_0} + V_0 \tag{1}$$

where
K: Boltzmann's constant
T: absolute temperature
q: electric charge
$V_O$: the base-emitter voltage with the collector current $i_O$ If it is assumed that the resistance of the variable resistor 19 is represented by $R_{19}$, and the currents of the constant current sources 20, 22 and 24 are represented by $i_{20}$, $i_{22}$ and $i_{24}$, respectively then the voltage $V_2$ at the emitter of the transistor 18 is:

$$V_2 = V_1 + i_{20} \cdot R_{19} \tag{2}$$

If it is assumed that the resistance of the level shifting resistor 21 is represented by $R_{21}$, then the voltage $V_3$ due to the voltage drop of the resistor 21 is expressed by the following equation (3):

$$V_3 = V_2 - i_{22} \cdot R_{21} \tag{3}$$

The voltage $V_3$ corresponds to the output B of the $S_V$ calculating circuit 2. If the resistance of the $A_V$ variable resistor 23 is represented by $R_{23}$, then the voltage $V_4$ due to the voltage drop of the variable resistor 23 is:

$$V_4 = V_2 - i_{24} \cdot R_{23} \tag{4}$$

The voltage $V_4$ corresponds to the output A of the $A_V$ calculating circuit 3. A voltage $V_5$ developed across the diode 26 by the current of the constant current source 25 can be expressed by the following equation (5) if the current is represented by $i_{25}$:

$$V_5 = \frac{KT}{q} \cdot \ln \cdot \frac{i_{25}}{i_0} + V_0 \tag{5}$$

The voltage $V_5$ corresponds to the output A' of the constant voltage source 4.

If the resistance of the $T_V$ variable resistor 29 is $R_{29}$, the base-emitter voltage of the transistor 31 is $V_{BE31}$, the resistance of the resistor 34 is $R_{34}$, a voltage across the resistor 34 is $V_6$, and the collector currents of the transistors 27 and 32 are $i_{27}$ and $i_{32}$, respectively, then the following equations (6) and (7) can be established:

$$i_{27} = V_{BE31}/R_{29} \tag{6}$$

$$i_{32} = V_g/R_{34} \tag{7}$$

In addition, if it is assumed that the base potentials of the transistors 27 and 32 are equal to $V_N$, then $$V_N = 2(\frac{KT}{q} \cdot \ln \cdot \frac{i_{27}}{i_0} + V_0) + V_{BE31} \tag{8}$$
$$= 2(\frac{KT}{q} \cdot \ln \cdot \frac{i_{32}}{i_0} + V_0) + V_6$$

Since the variations of the currents $i_{27}$ and $i_{32}$ due to the variations of the voltage $V_{BE31}$ and $V_6$ are slight and can be approximated to $V_{BE31} \simeq V_6$, the voltage $V_6$ can be calculated from the equations (6) through (8) as follows:

$$V_6 = 2\frac{KT}{q} \ln \frac{R_{34}}{R_{29}} + V_{BE31} \qquad (9)$$

$$= \frac{KT}{q}\left(2\ln\frac{R_{34}}{R_{29}} + \ln\frac{i_{30}}{i_0}\right) + V_0$$

where $i_{30}$ is the current of the constant current source 30. The voltage $V_6$ corresponds to the output B' of the voltage source 5.

Now, $V_5 - V_4$, that is, $A' - A$ will be obtained.

From the equations (1), (2), (4) and (5):

$$A' - A = \frac{KT}{q} \ln \frac{i_{25}}{i_p} - i_{20}\cdot R_{19} + i_{24}\cdot R_{23} \qquad (10)$$

As $i_p = i_{po}2B_V$, equation (10) can be rewritten into the following equation (11) where $i_{25} = 2^n i_{po}$ and $i_{po}$ is the photocurrent with $B_V = 0$:

$$A' - A = n\frac{KT}{q}\ln 2 - \left\{ B_V\cdot\frac{KT}{q}\ln 2 + i_{20}\cdot R_{19} - i_{24}\cdot R_{23} \right\} \qquad (11)$$

the term $$B_V\cdot\frac{KT}{q}\ln 2$$

indicates displacement corresponding to the variation of the object's brightness, and the term $$\frac{KT}{q}\ln 2$$

indicates a displacement value per exposure value step (variation of 1EV). In addition, if the displacement values for the terms $i_{20}\cdot R_{19}$ and $i_{24}\cdot R_{23}$ are set to be $$\frac{KT}{q}\ln 2,$$

the term $i_{20}\cdot R_{19}$ can be rewritten as $$S_V\cdot\frac{KT}{q}\ln 2,$$

while the term $i_{24}\cdot R_{23}$ can be rewritten as $$A_V\cdot\frac{KT}{q}\ln 2.$$

Therefore, the above-described equation (11) can be rewritten into equation (12) indicated below:

$$A' - A = \frac{KT}{q}\ln 2\{n - (B_V + S_V - A_V)\} \qquad (12)$$

In general, under the condition that the exposure is correct, the following equation (13) can be established:

$$B_V + S_V = A_V + T_V \qquad (13)$$

If equation (13) is substituted into equation (12), then $$A' - A = \frac{KT}{q}\ln 2\,(n - T_V) \qquad (14)$$

As the output A' is the constant voltage corresponding to $T_V = 11$ in equation (13) as was described before, $n = 11$ can be obtained by assuming $A' = A$. Therefore, equation (14) can be rewritten into the following equation (15):

$$A' - A = \frac{KT}{q}\ln 2\cdot(11 - T_V) \qquad (15)$$

Furthermore, with $$A' - A = k_1\frac{KT}{q}\ln 2,$$

from equation (15)

$$T_V = 11 - k_1 \qquad (16)$$

This means that if $A' = A$, or $k = 0$, then $T_V = 11$ and $$A' - A = 1 \times \frac{KT}{q}\ln 2;$$

if $k = 1$, that is, if the potential of A is lower by the unitary step $$\frac{KT}{q}\ln 2$$

than that of A', then $T_V = 10$, and so fourth. Accordingly, by subjecting the difference voltage between the outputs A' and A to analog-to-digital conversion, the digital data corresponding to the shutter speed can be obtained. Similarly, $B' - B$ can be obtained from the following equation (17):

$$B' - B = m\frac{KT}{q}\ln 2 - \left\{ B_V\frac{KT}{q}\ln 2 + (i_{20}R_{19} - i_{22}R_{21}) - \frac{KT}{q}\ln\left(\frac{R_{34}}{R_{29}}\right)^2 \right\} \qquad (17)$$

where $i_{30} = 2^m i_{po}$.

If the term $$\frac{KT}{q}\ln 2\left(\frac{R_{34}}{R_{29}}\right)^2$$

is replaced by $$k_2\frac{KT}{q}\ln 2$$

($k_2$ being the constant determined from the ratio of $R_{29}$ to $R_{34}$), and $R_{34} = R_{29}$, then $$k_2\frac{KT}{q}\ln 2 = \frac{KT}{q}\ln\alpha^2$$

Therefore, $k_2 = 2\log_2\alpha$ is obtained. If this is substituted into equation (17), then $$B' - B = m \frac{KT}{q} \ln 2 - \left\{ B_V \frac{KT}{q} \ln 2 + (i_{20}R_{19} - i_{22}R_{21}) - \frac{KT}{q} \ln 2 \cdot 2\log_2 \alpha \right\} \quad (18)$$

If $(i_{20}R_{19} - i_{22}R_{21})$ is set so as to change as much as $$\frac{KT}{q} \ln 2$$

per step, then $(i_{20}R_{19} - i_{22}R_{21})$ will become $$(S_V - k_3) \frac{KT}{q} \ln 2$$

(where $k_3$ is a constant). If addition, $2 \log_2 \alpha$ is the shutter speed value $T_V$ which is determined by the $T_V$ variable resistor 29 for $\alpha = 0.5$. If these are substituted into equation (18), then $$B' - B = \frac{KT}{q} \ln 2 \{ m - (B_V + S_V - k_3) - T_V \} \quad (19)$$

By substituting equation (13) into equation (19), equation (20) can be obtained:

$$B' - B = \frac{KT}{q} \ln 2 \, (m - k_3 - A_V) \quad (20)$$

Therefore, if m and $k_3$ are set to suitable values, the digital data corresponding to the aperture value can be obtained by subjecting the difference voltage between the outputs B' and B to analog-to-digital conversion.

Then, $B' - A$ can be obtained similarly as in the above-described case; that is, $B' - A$ can be expressed by the following equation (21):

$$B' - A = m \frac{KT}{q} \ln 2 - \left( B_V \frac{KT}{q} \ln 2 + i_{20}R_{19} - i_{24}R_{23} - \frac{KT}{q} \ln \left( \frac{R_{34}}{R_{29}} \right)^2 \right) \quad (21)$$

Similarly as in the case of equations (12) and (18), equation (21) can be rearranged as follows:

$$B' - A = \frac{KT}{q} \ln 2 \cdot \{ m - (B_V + S_V - A_V - T_V) \} \quad (22)$$

If it is assumed that $B_V + S_V - (A_V + T_V) = k_4$ (where $k_4$ is positive exposure and the amount of the difference from the correct exposure into account, then $$B' - A = \frac{KT}{q} \ln 2 \cdot (m - k_4) \quad (23)$$

Therefore, the digital data corresponding to the correct exposure and the amount of the difference from the correct exposure can be obtained by subjecting the difference voltage between the outputs B' and A to analog-to-digital conversion.

Figure 3:
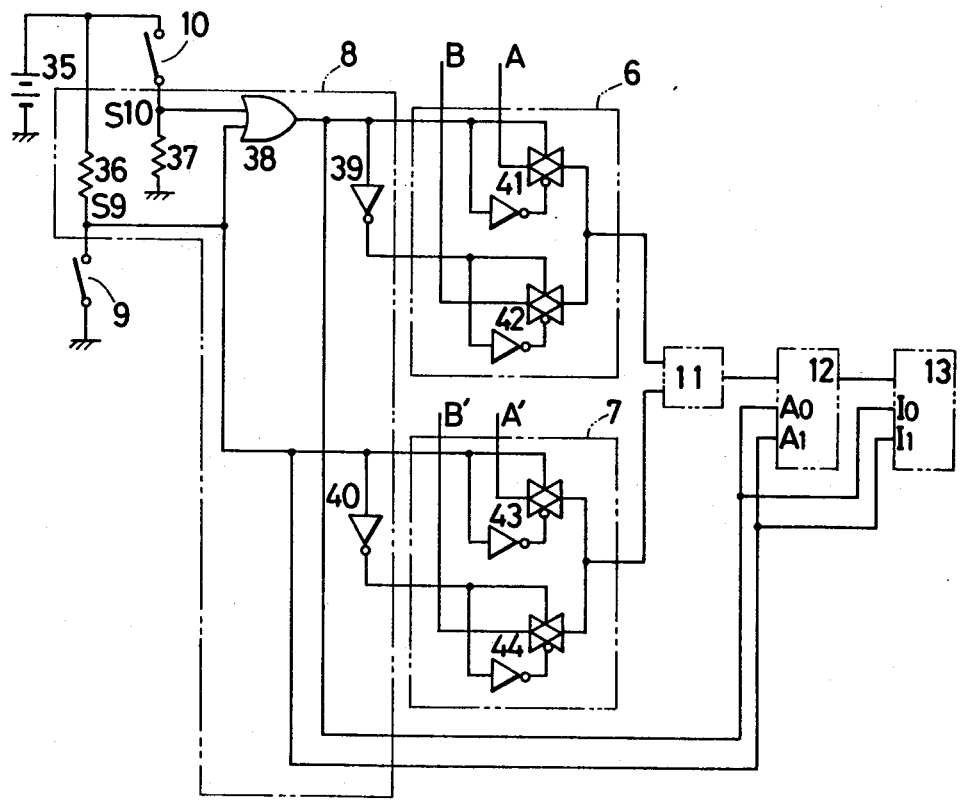
FIG. 3 is a schematic circuit diagram illustrating a specific example of selection circuits 6 and 7 and a logic circuit 8 shown in FIG. 1.

FIG. 3 shows a concrete example of the selection circuits 6 and 7 and the logic circuit 8. In FIG. 3, one contact of switch 9 is connected to the negative terminal or ground of the power supply 35, and the other contact is connected through a resistor 36 to the positive terminal of the power supply 35. One contact of switch 10 is connected to the positive terminal of the power supply 35, and the other contact is connected through a resistor 37 to the negative terminal or ground of the power supply 35. The connection point (S9) of the switch 9 and the resistor 36 is connected to one input of an OR gate circuit 38, the control terminal of a transmission gate (TG) 43, an inverter 40, the address $A_1$ of the read only memory (ROM) 12, and an input terminal $I_1$ of the display element 13. The connection point (S10) of the switch 10 and the resistor 37 is connected to the other input of the OR gate circuit 38, the output of which is connected to the control terminal of a transmission gate 41, and inverter 39, the address $A_0$ of the ROM 12, and the input terminal $I_0$ of the display unit 13. The outputs of the inverters 39 and 40 are connected to the control terminals of transmission gates 42 and 44, respectively. The aforementioned outputs A and B are applied to the input terminals of the transmission gates 41 and 42, respectively. The outputs of the transmission gates 41 and 42 are connected together to the A/D converter circuit 11. The above-described outputs A' and B' are applied to the input terminals of the transmission gates 43 and 44, respectively, the outputs of which are connected together to the A/D converter circuit 11.

In the circuit thus organized, the connection point S9 is at an "H" or high level (which is a voltage higher than the threshold voltage of the transmission gates) when the switch 9 is open, and it is at an "L" or low level (which is a voltage lower than the threshold voltage of the transmission gates) when the switch 9 is closed. The connection point S10 is at the "L" level when the switch 10 is open, and it is at the "H" level when it is closed. Accordingly, the output of the OR gate circuit 38 is at the "L" level only when the switch 9 is closed and the switch 10 is open. In this case, the selection circuit 6 renders the transmission gate 42 conductive to apply the output B to the A/D converter circuit 11, and both the address $A_0$ of the ROM and the input $I_0$ of the display element 12 are at the "L" level. With the other combinations of the states of the switches 9 and 10, the output of the OR gate circuit 38 is at the "H" level, and the selection circuit 6 operates to render the transmission gate 41 conductive to apply the output A to the A/D converter circuit 11. In this case, both the address $A_0$ of the ROM and the input $I_0$ of the display element have the "H" level. When the switch 9 is open and the connection point S9 is at the "H" level, the selection circuit 7 renders the transmission gate 43 conductive to apply the output A' to the A/D converter circuit 11. When the switch 9 is closed and the connection point S9 is at the "L" level, the selection circuit 7 renders the transmission gate 44 conductive to apply the output B' to the A/D converter circuit 11, and the address $A_1$ of the ROM and the input $I_1$ are at the same level ("H" or "L") as the connection point S9.

The operation described above is as indicated in Table 1 below:

TABLE 1

| Switch S9 | Switch S10 | Output of selection circuit 6 | Output of selection circuit 7 | Photographing system | $A_0$ $I_0$ | $A_1$ $I_1$ |
|---|---|---|---|---|---|---|
| open | open | A | A' | ES | H | H |
| open | closed | A | A' | ES | H | H |
| closed | open | B | B' | EE | L | L |

TABLE 1-continued

| Switch S9 | Switch S10 | Output of selection circuit 6 | Output of selection circuit 7 | Photo-graphing system | $A_0$ $I_0$ | $A_1$ $I_1$ |
|---|---|---|---|---|---|---|
| closed | closed | A | B' | Manual | H | L |

Figure 4:
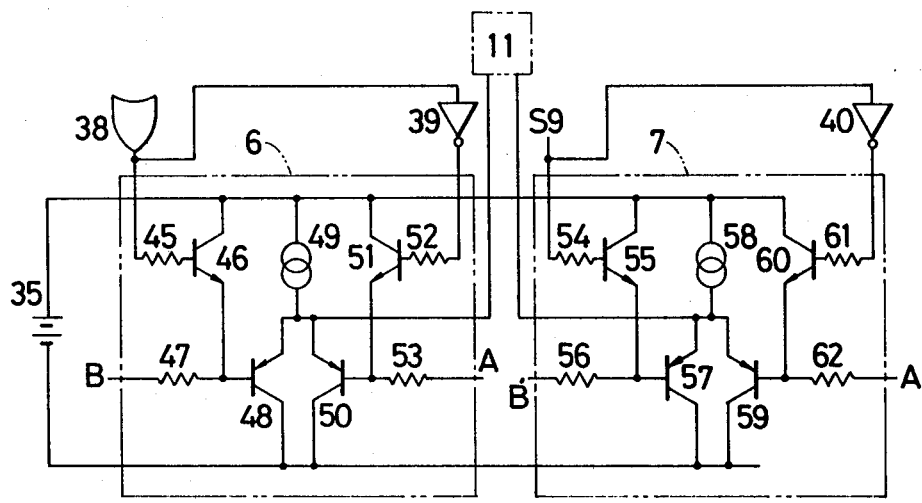
FIG. 4 is also a schematic circuit diagram showing an another specific example of the selection circuits 6 and 7.

FIG. 4 illustrates another example of the selection circuits 6 and 7. The selection circuit 6 will be first described. Transistors 48 and 50 whose collectors are grounded are driven by a constant current source 49, and the emitters thereof are connected to the A/D converter circuit. The aforementioned output B is applied through a resistor 47 to the base of the transistor 48. This base of the transistor 48 is connected to the emitter of a transistor 46 whose base and collector are connected respectively to an OR gate 38 through a resistor 45 and to the positive terminal of the power supply 35. The above-described output A is applied through a resistor 53 to the base of a transistor 50, which is connected to the emitter of a transistor 51, the base and collector of which are connected respectively to an inverter 39 through a resistor 52 and to the positive terminal of the power supply 35.

In the selection circuit thus organized, when the output of the OR gate circuit 38 is at the "L" level and the output of the inverter 39 is at the "H" level, the transistors 46 and 51 are rendered non-conductive and conductive, respectively. Therefore, a voltage $(B+V_{S1})$ is obtained at the emitters of the transistors 48 and 50, $V_{S1}$ being the sum of a voltage developed across the resistor 47 and the base-emitter voltage of the transistor 48. In contrast, when the output of the OR gate circuit 38 is at the "H" level and the output of the inverter 39 is at the "L" level, a voltage $(B+V_{S2})$ is obtained at the emitters of the transistors 48 and 50, $V_{S2}$ being the sum of a voltage across the resistor 53 and the base-emitter voltage of the transistor 50. In general, in a circuit organized as in FIG. 4 in the form of an integrated circuit, $V_{S1} \approx V_{S2}$. If this data is replaced by $V_S$, an output $(B+V_S)$ or $(A+V_S)$ is produced by the selection circuit 6.

The construction of the selection circuit 7 is similar to that of the selection circuit 6 as is apparent from FIG. 4. Therefore, an output $(B'+V_S)$ or $(A'+V_S)$ is produced by the selection circuit 7. The A/D converter circuit 11 is so designed to subject the difference voltages to analog-to-digital conversion, as previously described.

Figure 5:
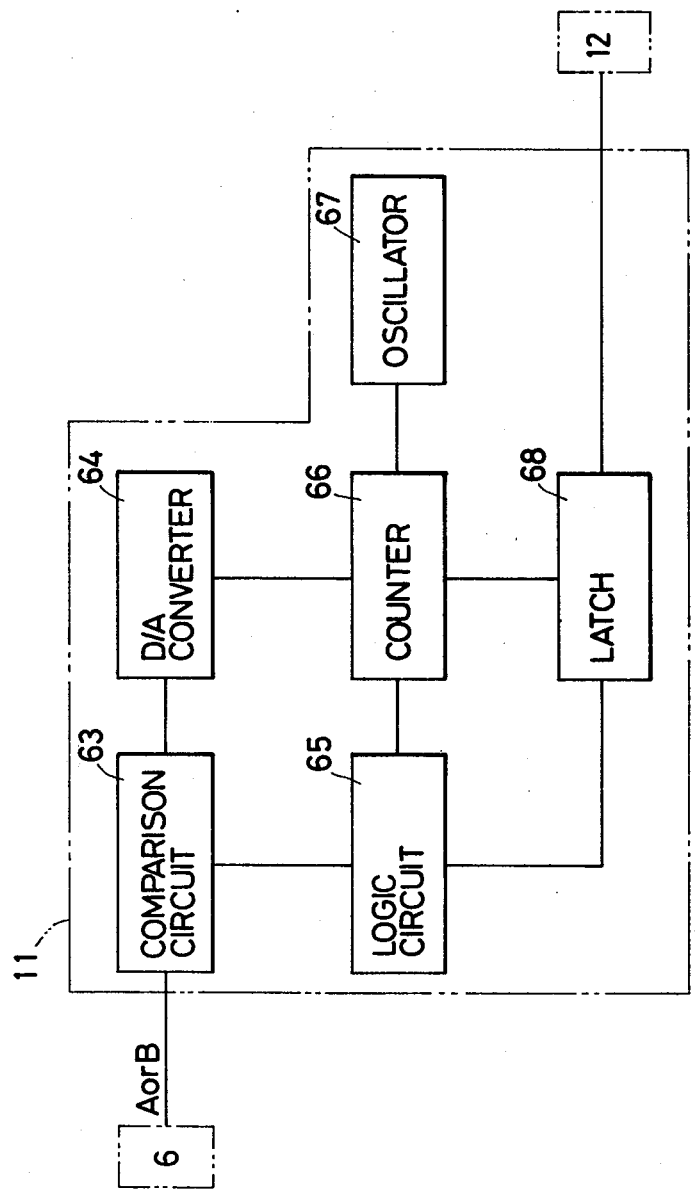
FIG. 5 is a block diagram showing an example of an A/D converter circuit 11 shown in FIG. 1.

FIG. 5 shows an example of the above-described A/D converter circuit 11. In FIG. 5, reference numeral 67 designates an oscillator which is connected to a counter 66 operating to count pulses provided by the oscillator 67. Connected to the counter 66 are a digital-to-analog (D/A) converter circuit 64 for converting the count content of the counter 66 into an analog voltage. A latch circuit 68 is controlled by a logic circuit 65 which receives the outputs of the counter 66 and a comparison circuit 63 compares the information from the selection circuit 6 with that from the D/A converter circuit 64. The ROM 12 is connected to the output of latch circuit 68.

In the circuit 11 thus organized, the content of the counter 66 operating to count the output pulses of the oscillator 67 is converted into an analog voltage by the D/A converter circuit 64, the analog voltage being compared with the voltage from the selection circuit 6 in the comparison circuit 63. With the analog voltage reaches the value of the voltage from the selection circuit 6, the content of the counter 66 is stored in the latch circuit 68 through the operation of the logic circuit 65. A part of the ROM address is specified by applying the content of the latch circuit 68 to the ROM 12.

Figure 6:
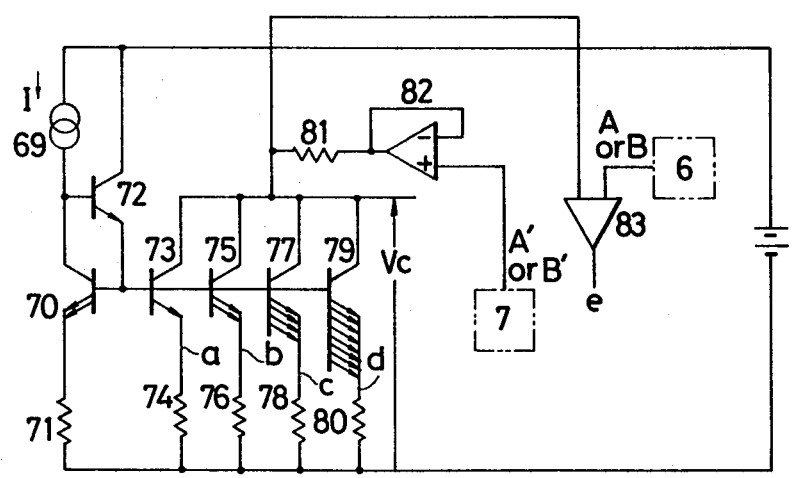
FIG. 6 is a schematic circuit diagram illustrating a specific example of a D/A converter circuit 64 and a comparison circuit 63 shown in FIG. 5.

Shown in FIG. 6 are concrete examples of the D/A converter circuit 64 and the comparison circuit shown in FIG. 5. In FIG. 6, the output of a constant current source 69 is applied to the collector of a transistor 70 and is fed back to the base thereof through a transistor 72. The emitter regions (areas) of transistors 73, 75, 77 and 79 are set in the ratio of 1:2:4:8. Resistors 74, 76, 78 and 80 are connected to the emitters of the transistors 73, 75, 77 and 79, respectively. An operational amplifier 82 forms a voltage follower circuit for the above-described selection circuit 7. The aforementioned selection circuit 6 is connected to one input terminal of a comparator 83, and the output of the operational amplifier 82 is connected through a resistor 81 to the other input terminal of comparator 83. In the circuit thus organized, the relation (the output of the selection circuit 7) $\geq$ (the output of the selection circuit 6) is established.

The operation of the circuit shown in FIG. 6 will now be described. If the current of the constant current source 69 is represented by I and the resistance of the resistors 71, 74, 76, 78 and 80 are selected in the relation of 4:8:4:2:1, then the collector currents of the transistors 73, 75, 77 and 79 will be I/2, I, 2I and 4I, respectively. Furthermore, if the resistance of the resistor 81 is represented by $R_{81}$ and the voltage drop $(I/2) \times R_{81}$ across the resistor 81 due to the collector current of the transistor 73 is made to be equal to the voltage per step $$\frac{KT}{q} \ln 2$$

which is included in equations (11) through (23), a voltage lower by as much as an integer (0 to 15) multiple of the step voltage $$\frac{KT}{q} \ln 2$$

than the voltage of the output A' and B' of the selection circuit 7 is applied to the common collector terminal of the transistors 73, 75, 77 and 79. If this voltage is expressed by $V_C$, the relationships of the voltage $V_C$ and the emitter terminals a, b, c and d of the transistors 73, 75, 77 and 79 are as indicated in Table 2 below:

TABLE 2

| d | c | b | a | $V_C + A'$ or $V_C + B'$ | d | c | b | a | $V_C + A'$ or $V_C + B'$ |
|---|---|---|---|---|---|---|---|---|---|
| H | H | H | H | 0 | L | H | H | H | $8 \frac{KT}{q} \ln 2$ |
| H | H | H | L | $\frac{KT}{q} \ln 2$ | L | H | H | L | $9 \frac{KT}{q} \ln 2$ |
| H | H | L | H | $2 \frac{KT}{q} \ln 2$ | L | H | L | H | $10 \frac{KT}{q} \ln 2$ |
| H | H | L | L | $3 \frac{KT}{q} \ln 2$ | L | H | L | L | $11 \frac{KT}{q} \ln 2$ |
| H | L | H | H | $4 \frac{KT}{q} \ln 2$ | L | L | H | H | $12 \frac{KT}{q} \ln 2$ |
| H | L | H | L | $5 \frac{KT}{q} \ln 2$ | L | L | H | L | $13 \frac{KT}{q} \ln 2$ |
| H | L | L | H | $6 \frac{KT}{q} \ln 2$ | L | L | L | H | $14 \frac{KT}{q} \ln 2$ |
| H | L | L | L | $7 \frac{KT}{q} \ln 2$ | L | L | L | L | $15 \frac{KT}{q} \ln 2$ |

The voltage $V_C$ and the output A or B of the selection circuit 6 are applied to the comparator 83. On the basis of Table 2, and equations (15), (20) and (23), the difference voltages applied in various photographing systems are converted into 4-bit digital signals. In the ES photographing system, the conversion is as indicated in Table 3 below on the basis of Table 2 and equation (15):

TABLE 3

| d | c | b | a | $T_V$ | d | c | b | a | $T_V$ |
|---|---|---|---|---|---|---|---|---|---|
| H | H | H | H | 11 | L | H | H | H | 3 |
| H | H | H | L | 10 | L | H | H | L | 2 |
| H | H | L | H | 9 | L | H | L | H | 1 |
| H | H | L | L | 8 | L | H | L | L | 0 |
| H | L | H | H | 7 | L | L | H | H | −1 |
| H | L | H | L | 6 | L | L | H | L | −2 |
| H | L | L | H | 5 | L | L | L | H | −3 |
| H | L | L | L | 4 | L | L | L | L | −4 |

Furthermore, if $m=12$ and $k_3=9$ in equations (20) and (23), in the case of the EE photographing system or the manual photographing the following Table 4 can be obtained on the basis of Table 2:

TABLE 4

| d | c | b | a | $A_V$ in EE system | $K_4$ (exposure value difference) in manual system |
|---|---|---|---|---|---|
| H | H | H | H | 11 | 12 (12EV over) |
| H | H | H | L | 10 | 11 (11EV over) |
| H | H | L | H | 9 | 10 (10EV over) |
| H | H | L | L | 8 | 9 (9EV over) |
| H | L | H | H | 7 | 8 (8EV over) |
| H | L | H | L | 6 | 7 (7EV over) |
| H | L | L | H | 5 | 6 (6EV over) |
| H | L | L | L | 4 | 5 (5EV over) |
| L | H | H | H | 3 | 4 (4EV over) |
| L | H | H | L | 2 | 3 (3EV over) |
| L | H | L | H | 1 | 2 (2EV over) |
| L | H | L | L | 0 | 1 (1EV over) |
| L | L | H | H | −1 | 0 (correct exposure) |
| L | L | H | L | −2 | −1 (1EV under) |
| L | L | L | H | −3 | −2 (2EV under) |
| L | L | L | L | −4 | −3 (3EV under) |

The above-described operation is in the case where the relation (the output of the selection circuit 7)≧(the output of the selection circuit 6) is established. However, in the case where the relation (the output of the selection circuit 7)≦(the output of the selection circuit 6), the circuit shown in FIG. 6 can be modified in such a manner that the selection circuit 6 is connected to the inverted input terminal of the operational amplifier 82 and the output connection to the comparator 83 is correspondingly changed to perform the same A/D conversion.

Figure 7:
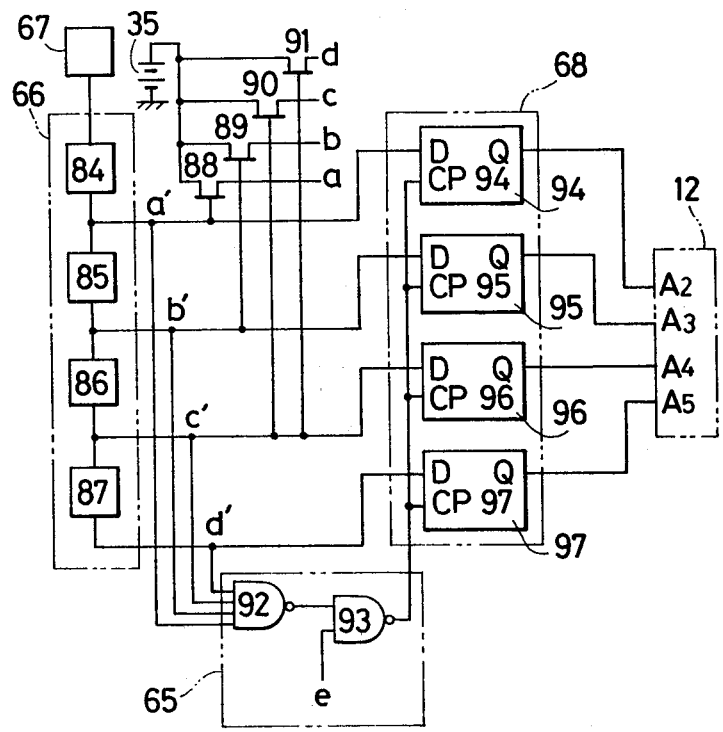
FIG. 7 is a schematic circuit diagram illustrating a specific example of a logic circuit 65, a counter 66, an oscillator 67 and a latch circuit 68 shown in FIG. 5.

FIG. 7 illustrates concrete examples of the logic circuit 65, the counter 66, the oscillator 67 and the latch circuit shown in FIG. 5. In FIG. 7, output pulses of the oscillator 67 are counted by flip-flop circuits 84, 85, 86 and 87. Connected to the outputs of these flip-flop circuits are the gates of field-effect transistors (FET) 88, 89, 90 and 91 for controlling the emitters of the transistors 73, 75, 77 and 79 in FIG. 6, the sources thereof being connected to the power supply 35, a NAND gate circuit 92, and D-type flip-flop circuits 94, 95, 96 ad 97. The output of the NAND gate circuit 92 is connected to one input of a NAND gate circuit 93 the other input of which is connected to the output terminal e of the comparator 83 described before. The output of the NAND gate circuit 93 is connected to the terminals CP of the D-type flip-flop circuits 94, 95, 96 and 97. In operation, the flip-flop circuits 84 through 87 which are triggered by the rising part of the pulse produced by the oscillator 67 operate to count the pulses, and the D/A converter shown in FIG. 6 changes its level as described with reference to FIG. 5 in response to the outputs a, b, c and d of the FET's 88 through 91. When this level reaches the level of the output A' or B' of the selection circuit 6, the level of the output terminal e of the comparator 83 is changed from the "H" level to the "L" level. Since the output of the NAND gate circuit 92 is at the "H" level at all times except the time when all of the inputs thereof are at the "H" level, the level change from the "H" to "L", of the comparator 83 triggers the D-type flip-flops through the NAND gate circuit 93. As a result, the D-type flip-flops 94 through 97 operate to store the contents of the flip-flop circuits 84 through 87, respectively. When the common collector voltage $V_C$ of the aforementioned transistors 73, 75, 77 and 79 is higher than the output of the selection circuit 6 even with the outputs a, b, c and d at the "H" level, the output e of the comparator 83 remains at the "H" level; however, because of the output level change, from the "H" level to the "L" level, of the NAND gate circuit 92 the contents of the flip-flop circuits 84 through 87 are stored in the D-type flip-flop circuits 94 through 97, respectively. In this connection, the logic levels ("H" or "L") of the outputs a', b', c' and d' of the flip-flop circuits 84 through 87 are equal to those of the emitters of the transistors 73, 75, 77 and 79.

As was described before, the addresses $A_0$ and $A_1$ of the ROM 12 are determined, as in Table 1, by the switches 9 and 10 and the logic circuit 8 according to the selected photographing system. The outputs $Q_{94}$, $Q_{95}$, $Q_{96}$ and $Q_{97}$ of the A/D converter circuit described above are applied to the addresses $A_2$, $A_3$, $A_4$ and $A_5$ of the ROM 12. The addresses $A_0$, $A_1$, $A_2$, $A_3$, $A_4$ and $A_5$ specify the exposure information to be displayed. Therefore, the number display section in the display element 13, comprising for instance a 4-digit 7-segment LED (light emitting diode) display element and a decimal point displaying LED, is energized by the output of ROM 12 to display as indicated in Table 5 based on Tables 3 and 4.

TABLE 5

| $A_5$ | $A_4$ | $A_3$ | $A_2$ | $A_1$ | $A_0$ | Meaning of address | Display example | Meaning of display |
|---|---|---|---|---|---|---|---|---|
| L | H | H | L | H | H | $T_V^2$ | | Shutter speed ¼ |
| L | H | L | H | H | H | $T_V^1$ | | Shutter speed ½ |
| L | H | H | L | L | L | $A_V^2$ | | Lens stop value F2 |
| L | H | L | H | L | L | $A_V^1$ | | Lens stop value F1.4 |
| L | H | H | L | L | H | $k_4 = 3$ | | 3EV over |
| L | H | L | H | L | H | $k_4 = 2$ | | 2EV over |

Figure 8:
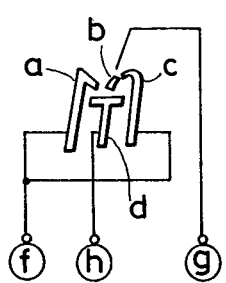
FIG. 8 is an explanatory diagram illustrating one example of a character and symbol displaying section of a display element 13.

FIG. 8 illustrates one example of the character or symbol display section of the display element 13, in which the segments a and c are connected to an electrode f, the segment b to an electrode g, and the segment d to an electrode h.

Figure 9:
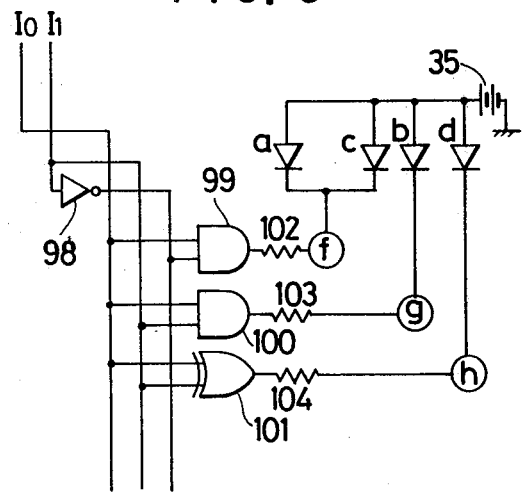
FIG. 9 is a schematic circuit diagram showing one example of a drive circuit for the display element.

FIG. 9 shows one example of a drive circuit for the display element 13 shown in FIG. 8. The segments a through d are light emitting diodes whose anodes are connected to the power supply 35. The electrode f is connected through a resistor 102 to the output of a NAND gate circuit 99, to which the display element input $I_0$ is directly applied and the display element input $I_1$ is applied through an inverter 98. The electrode g is connected through a resistor 103 to an AND gate circuit 100 to which the display element inputs $I_0$ and $I_1$ are applied. The electrode g is connected through a resistor 104 to an EXCLUSIVE OR gate circuit 101 to which the display element inputs $I_0$ and $I_1$ are applied. With the circuit thus organized, in the ES photographing system, $I_0 = I_1 = H$ as indicated in Table 1. Therefore, the output of the EXCLUSIVE OR gate circuit 101 only is at the "L" level, and only the segment d is illuminated, so as to display the character "T". In the EE photographing system, $I_0 = I_1 = L$. Therefore, the outputs of the AND gate 100 and the EXCLUSIVE OR gate circuit 101 are at the "L" level, and therefore the segments b and d are illuminated, so as to display the character "f". In the manual photographing system, $I_0 = H$ and $I_1 = L$. Therefore, the outputs of the NAND gate circuit 99 and the AND gate circuit 100 emit light, so as to display the character "M".

This invention has been described with reference to a camera incorporating an exposure meter; however, it should be noted that the invention can be applied to a separate exposure meter.

As is apparent from the above description, according to the invention, in a variety of photographing systems, two out of the various analog voltages to be converted into digital data are selected, and the difference of the two voltages thus selected are subjected to analog-digital conversion by the A/D converter circuit. Therefore, the digital exposure display circuit according to the invention is simple in construction. Furthermore, not only the shutter speed automatically set, the lens stop value, the conditions indicating whether or not the exposure is correct, and the difference from the correct exposure can be displayed, but also the selected photographing system can be displayed by using the digital display element. Accordingly, the error that the user recognizes the displayed numerals for displays in other photographing systems that the actually selected photographing system can be positively eliminated. In addition, the circuit is free of excessively many pieces of information which are, in general, involved in the high-grade cameras, and the absolutely necessary information can be clearly displayed by the simple circuit according to the invention.

What is claimed is:

1. A digital exposure display circuit comprising:
   a first circuit for outputting a voltage proportional to the sum of the brightness of an object to be photographed and a film sensitivity;
   a second circuit for outputting a voltage proportional to a value obtained by subtracting a lens stop value from the output of said first circuit;
   a constant voltage source;
   a voltage source for providing a voltage corresponding to a manually set shutter speed;
   selecting means for selecting the outputs of said second circuit and said constant voltage source in a lens stop priority photographing system in which a lens stop is manually set and a shutter speed is automatically set, for selecting outputs of said first circuit and said voltage source in a shutter speed priority photographing system in which a shutter speed is manually set and a lens stop is automatically set, and for selecting the outputs of said second circuit and said voltage source in a manual photographing system in which both a shutter speed and a lens stop are manually set,
   an analog-to-digital converter circuit for converting the difference between the selected analog voltages applied thereto by said selecting means into digital data, and
   display means connected to said analog-to-digital converter for displaying said digital data.

2. A digital exposure display circuit as claimed in claim 1, wherein said selection means comprises a first selection circuit for providing at its output a selected one of the outputs of said first and second circuits and a second selection circuit for providing at its output a selected one of the outputs of said constant voltage source and said voltage source, and the polarity of the difference between the outputs of said two selection circuits in either the lens stop priority photographing system, the shutter priority photographing system, or the manual photographing system is always the same.

3. A digital exposure display circuit as claimed in claim 2, wherein said first and second selection circuits comprise transmission gates.

4. A digital exposure display circuit as claimed in claim 2, wherein said first and second selection circuits comprise transistor switching circuits.

5. A digital exposure display circuit as claimed in claim 2, wherein said display means includes a read only memory for providing display information in response to an address, said exposure display circuit further comprising a logic circuit for controlling said first and second selection circuits and specifying a part of the address of said read only memory, the other part of said address being provided by said analog-to-digital converter.

6. A digital exposure display circuit as claimed in claim 5, wherein said display means further comprises a display element which is driven by said logic circuit to selectively display a symbol indicative of the selected photographing system.

7. A digital exposure display circuit as claimed in claim 1, wherein the output of said constant voltage source represents a fixed shutter speed value.

* * * * *